United States Patent
Zhang et al.

(10) Patent No.: US 11,950,249 B2
(45) Date of Patent: *Apr. 2, 2024

(54) TWO-STAGE GRANT FOR UPLINK DATA TRANSMISSION IN NEW RADIO-UNLICENSED (NR-U)

(71) Applicant: QUALCOMM Incorporated, San Diego, CA (US)

(72) Inventors: Xiaoxia Zhang, San Diego, CA (US); Jing Sun, San Diego, CA (US); Kapil Bhattad, Bangalore (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 526 days.

This patent is subject to a terminal disclaimer.

(21) Appl. No.: 17/248,830

(22) Filed: Feb. 9, 2021

(65) Prior Publication Data
US 2021/0176779 A1   Jun. 10, 2021

Related U.S. Application Data

(63) Continuation of application No. 16/433,393, filed on Jun. 6, 2019, now Pat. No. 10,945,283.

(30) Foreign Application Priority Data

Jun. 8, 2018   (IN) .............................. 201841021536
Aug. 16, 2018   (IN) .............................. 201841030707

(51) Int. Cl.
*H04W 72/23*   (2023.01)
(52) U.S. Cl.
CPC .................................. *H04W 72/23* (2023.01)

(58) Field of Classification Search
CPC ....................................................... H04W 72/23
(Continued)

(56) References Cited

U.S. PATENT DOCUMENTS 10,015,812 B2   7/2018   Edlis et al.
10,187,186 B2   1/2019   Chen et al.
(Continued)

FOREIGN PATENT DOCUMENTS

EP   3319385 A1   5/2018
WO   2016054238 A2   4/2016

OTHER PUBLICATIONS

Qualcomm Incorporated: "TxOP Frame Structure for NR Unlicensed", R1-1807386, 3GPP TSG RAN WG1 Meeting #93, 7.6.2 Frame Structure for NR-U Operation, 3rd Generation Partnership Project, Mobile Competence Centre, 650, Route Des Lucioles, F-06921 Sophia-Antipolis Cedex, France, vol. RAN WG1, No. Busan, Korea, May 20, 2018-May 25, 2018, May 12, 2018, XP051463077, pp. 1-8.
(Continued)

*Primary Examiner* — Nghi H Ly
(74) *Attorney, Agent, or Firm* — Haynes and Boone, LLP

(57) ABSTRACT

Wireless communications systems and methods related to communicating in a communication medium are provided. A first wireless communication device communicates with a second wireless communication device, a first scheduling grant. The first wireless communication device communicates, with the second wireless communication device, a second scheduling grant including at least one of a start slot index (SSI) or a slot format indicator (SFI). The first wireless communication device communicates, with the second wireless communication device, an uplink communication signal based on the first scheduling grant and the second scheduling grant.

30 Claims, 9 Drawing Sheets

(58) Field of Classification Search
USPC ............... 370/329, 328, 338, 341, 345, 350
See application file for complete search history.

(56) References Cited

U.S. PATENT DOCUMENTS

| | | | |
|---|---|---|---|
| 10,512,072 B2 | 12/2019 | Yi et al. | |
| 10,542,536 B2 | 1/2020 | Dinan et al. | |
| 10,945,283 B2* | 3/2021 | Zhang | H04W 72/23 |
| 2006/0209970 A1 | 9/2006 | Kanterakis | |
| 2018/0278403 A1 | 9/2018 | Yerramalli et al. | |
| 2019/0261398 A1 | 8/2019 | Golitschek Edler Von Elbwart | |
| 2019/0380143 A1 | 12/2019 | Zhang et al. | |
| 2020/0068605 A1 | 2/2020 | Golitschek Edler Von Elbwart | |

OTHER PUBLICATIONS

Huawei et al., "Two-Stage Scheduling for eLAA", 3GPP Draft; R1-166137, 3rd Generation Partnership Project (3GPP), Mobile Competence Centre, 650, Route Des Lucioles, F-06921 Sophia-Antipolis Cedex, France vol. RAN WG1 No. Gothenburg. Sweden; Aug. 22, 2016-Aug. 26, 2016 Aug. 21, 2016, XP051125232, Retrieved from the Internet: URL:http://www.3gpp.org/ftp/Meetings_3GPP_SYNC/RAN1/Docs/ [retrieved on Aug. 21, 2016], 5 pages.

International Search Report and Written Opinion—PCT/US2019/036031—ISA/EPO—dated Aug. 12, 2019.

Nokia et al., "On Two-Stage UL scheduling for eLAA", 3GPP Draft; R1-164942, 3rd Generation Partnership Project (3GPP), Mobile Competence Centre, 650, Route Des Lucioles, F-06921 Sophia-Antipolis Cedex, France vol. RAN WG1 No. Nanjing, China; May 23, 2016-May 27, 2016 May 13, 2016, XP051096811, Retrieved from the Internet: URL:http://www.3gpp.org/ftp/tsg_ran/WG1_RL1/TSGR1_85/Docs/ [retrieved on May 13, 2016], 7 pages.

Nokia et al., "On Two-Stage UL Scheduling for eLAA", 3GPP Draft; R1-167074, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 22, 2016-Aug. 26, 2016 Aug. 21, 2016, XP051125685, Retrieved from the Internet: URL:http://www.3gpp.org/ftp/Meetings_3GPP_SYNC/RAN1/Docs/ [retrieved on Aug. 21, 2016], 7 pages.

NTT Docomo, et al., "Views on UE Behavior for Group-common PDCCH," 3GPP Draft; R1-1711096, 3rd Generation Partnership Project (3GPP), Mobile Competence Centre; 650, Route Des Lucioles; F06921 Sophia-Antipolis Cedex; France, vol. RAN WG1, No. Qingdao, P.R., China; Jun. 27, 2017-Jun. 30, 2017, Jun. 26, 2017, XP051300296, 3 pages, Retrieved from the Internet: URL:http://www.3gpp.org/ftp/Meetings_3GPP_SYNC/RAN1/Docs/ [retrieved on Jun. 26, 2017].

Samsung: "Discussion on Two-Step UL Grant Scheduling", 3GPP Draft; R1-166691, 3rd Generation Partnership Project (3GPP), Mobile Competence Centre; 650, Route Des Lucioles; F-06921 Sophia-Antipolis Cedex; France, vol. RAN WG1, No. Gothenburg, Sweden, Aug. 22, 2016-Aug. 26, 2016, Aug. 21, 2016, XP051125514, Retrieved from the Internet: URL:http://www.3gpp.org/ftp/Meetings_3GPP_SYNC/RAN1/Docs/ [retrieved on Aug. 21, 2016], 3 pages.

* cited by examiner

TWO-STAGE GRANT FOR UPLINK DATA TRANSMISSION IN NEW RADIO-UNLICENSED (NR-U)

CROSS REFERENCE TO RELATED APPLICATIONS

The present application is a continuation application of U.S. application Ser. No. 16/433,393, filed Jun. 6, 2019, which claims priority to and the benefit of India Patent Application No. 201841021536, filed Jun. 8, 2018, and Indian Patent Application No. 201841030707, filed Aug. 16, 2018, each of which is hereby incorporated by reference in its entirety as if fully set forth below and for all applicable purposes.

TECHNICAL FIELD

This application relates to wireless communication systems, and more particularly to communicating a two-stage grant for communicating in a communication medium shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the Long-Term Evolution (LTE) technology to a next generation new radio (NR) technology. For example, NR may operate over a wider bandwidth (BW) at higher frequencies than LTE. In addition, NR introduces the concept of BWPs, where a BS may dynamically configure a UE to communicate over a portion of a network system BW instead of over the entire network system BW. The use of BWPs can provide several benefits, such as reducing UE BW capability requirements, reducing power consumptions at UEs, reducing signaling overheads, and/or allowing for load balancing within a component carrier (CC), despite the wider network system BW. Further, NR may operate across different spectrum types, from licensed spectrum to unlicensed and shared spectrum. Spectrum sharing enables operators to opportunistically aggregate spectrums to dynamically support high-BW services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. A transmitting node may listen to one or more channels (e.g., frequency subbands) within the frequency spectrum. Depending on the LBT result, the transmitting node may access one or more channels.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device with a second wireless communication device, a first scheduling grant; communicating, by the first wireless communication device with the second wireless communication device, a second scheduling grant including at least one of a start slot index (SSI) or a slot format indicator (SFI); and communicating, by the first wireless communication device with the second wireless communication device, an uplink communication signal based on the first scheduling grant and the second scheduling grant.

In an additional aspect of the disclosure, an apparatus includes a transceiver configured to communicate, with a second wireless communication device, a first scheduling grant; communicate, with the second wireless communication device, a second scheduling grant including at least one of a SSI or a SFI; and communicate, by the first wireless communication device with the second wireless communication device, an uplink communication signal based on the first scheduling grant and the second scheduling grant.

In an additional aspect of the disclosure, a computer-readable medium having program code recorded thereon, the program code includes code for causing a first wireless communication device to communicate, with a second wireless communication device, a first scheduling grant; code for causing a first wireless communication device to communicate, with a second wireless communication device, a second scheduling grant including at least one of a SSI or a SFI; and code for causing a first wireless communication device to communicate, an uplink communication signal based on the first scheduling grant and the second scheduling grant.

In an additional aspect of the disclosure, an apparatus includes means for communicating, with a second wireless communication device, a first scheduling grant; means for communicating, with a second wireless communication device, a second scheduling grant including at least one of a SSI or a SFI; and means for communicating, with the second wireless communication device, an uplink communication signal based on the first scheduling grant and the second scheduling grant.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
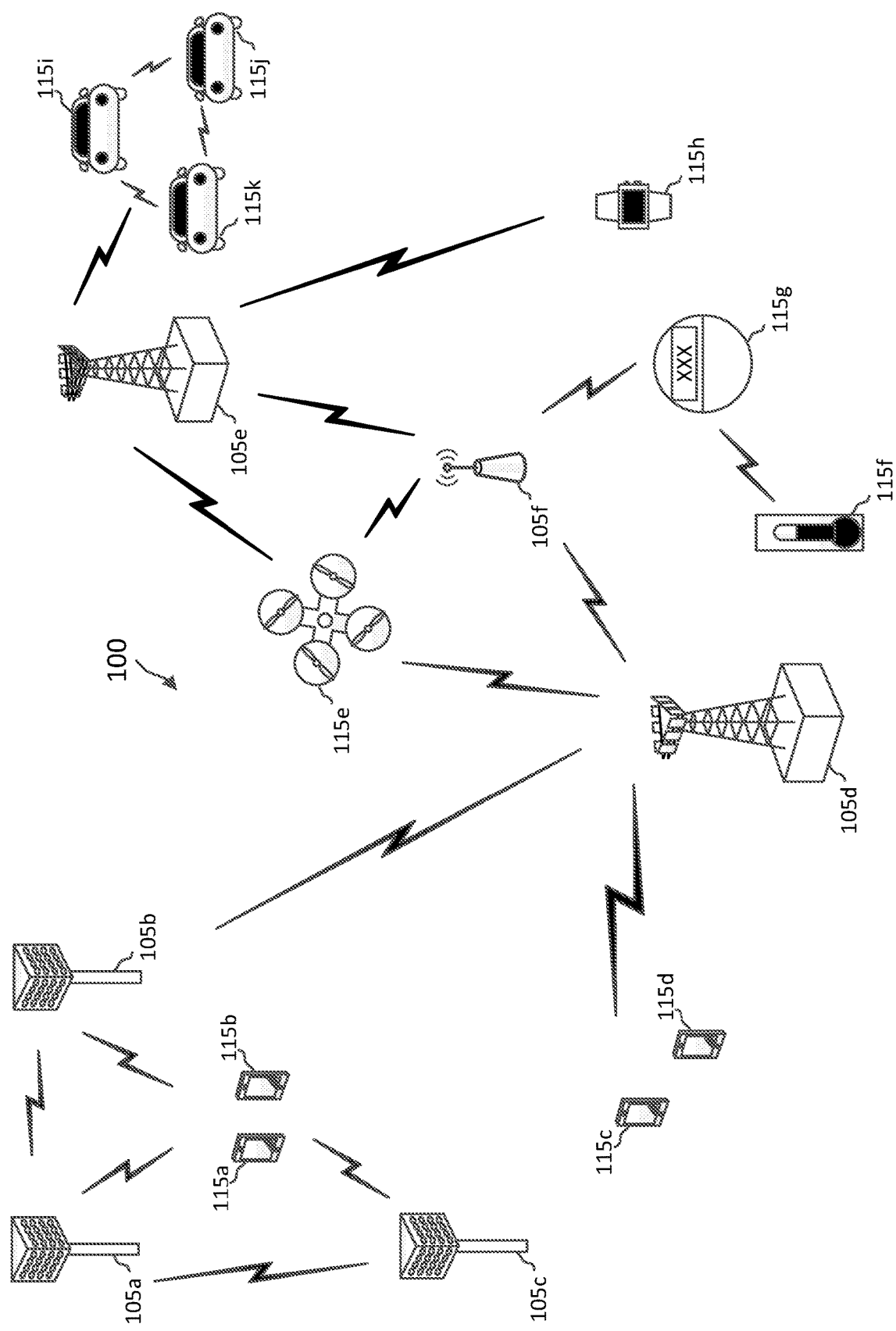
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aim to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ULtra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 milliseconds (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with UL/DL scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of ordinary level of skill in the art should appreciate that an aspect disclosed herein may be implemented independently of any other aspects and that two or more of these aspects may be combined in various ways. For example, an apparatus may be implemented, or a method may be practiced using any number of the aspects set forth herein. In addition, such an apparatus may be implemented, or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer.

A BS may partition a shared frequency band or an unlicensed frequency band into a plurality of channels. Channel access in the frequency band may be in units of channels. A BS or a UE may perform an LBT in the frequency band and may access one or more of the channels based on the result of the LBT. While the disclosed embodiments are described in the context of NR-unlicensed (NR-U), the disclosed embodiments are suitable for use with any wireless communication networks that operate over a shared frequency band or an unlicensed frequency band.

The present disclosure provides mechanisms for utilization of a two-stage grant for communicating in a communication medium shared by multiple network operating entities. In an example, a first wireless communication device communicates with a second wireless communication device a first scheduling grant and a second scheduling grant. The second scheduling grant may include at least one of a start slot index (SSI) or a slot format indicator (SFI). The SSI or SFI may provide an indication regarding a proper time to communicate an uplink communication signal. Additionally, the first wireless communication device communicates with the second wireless communication device an uplink communication signal based on the first scheduling grant and the second scheduling grant.

The first scheduling grant is transmitted in a first stage and the second scheduling grant is transmitted in a second stage of the two-stage grant technique. The first and second scheduling grants may be included in separate TXOPs. Additionally, the UL communication signal may be communicated in the subsequent TXOP. In an example, a BS transmits a first UL scheduling grant in one TXOP and transmits a second UL scheduling grant in a subsequent TXOP. The UE receives the first and second UL scheduling grants. Additionally, the UE transmits an UL data packet in the subsequent TXOP based on the first and second scheduling grants. The UL communication signal may also be referred to as an UL data packet.

FIG. 1 illustrates a wireless communication network 100 according to embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of 3 dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT), and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V) communication.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing (SCS) between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, the MIB, the RMSI, and/or the OSI in the form of synchronization signal blocks (SSBs).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively.

After receiving the PSS and SSS, the UE 115 may receive a MIB, which may be transmitted in the physical broadcast channel (PBCH). The MIB may include system information for initial network access and scheduling information for RMSI and/or OSI. After decoding the MIB, the UE 115 may receive RMSI and/or OSI. The RMSI and/or OSI may include radio resource configuration (RRC) information related to random access channel (RACH) procedures, paging, physical uplink control channel (PUCCH), physical uplink shared channel (PUSCH), power control, SRS, and cell barring. After obtaining the MIB, the RMSI and/or the OSI, the UE 115 can perform a random access procedure to establish a connection with the BS 105. After establishing a connection, the UE 115 and the BS 105 can enter a normal operation stage, where operational data may be exchanged.

In an embodiment, the network 100 may operate over a shared frequency band or an unlicensed frequency band, for example, at about 3.5 gigahertz (GHz), sub-6 GHz or higher frequencies. For example, the BSs 105 and the UEs 115 may be operated by multiple network operating entities sharing resources in the shared communication medium and may employ a listen-before-talk (LBT) procedure to reserve transmission opportunities (TXOPs) in the shared medium for communications. The network 100 may partition the frequency band into multiple channels, for example, each occupying about 20 megahertz (MHz).

Figure 2:
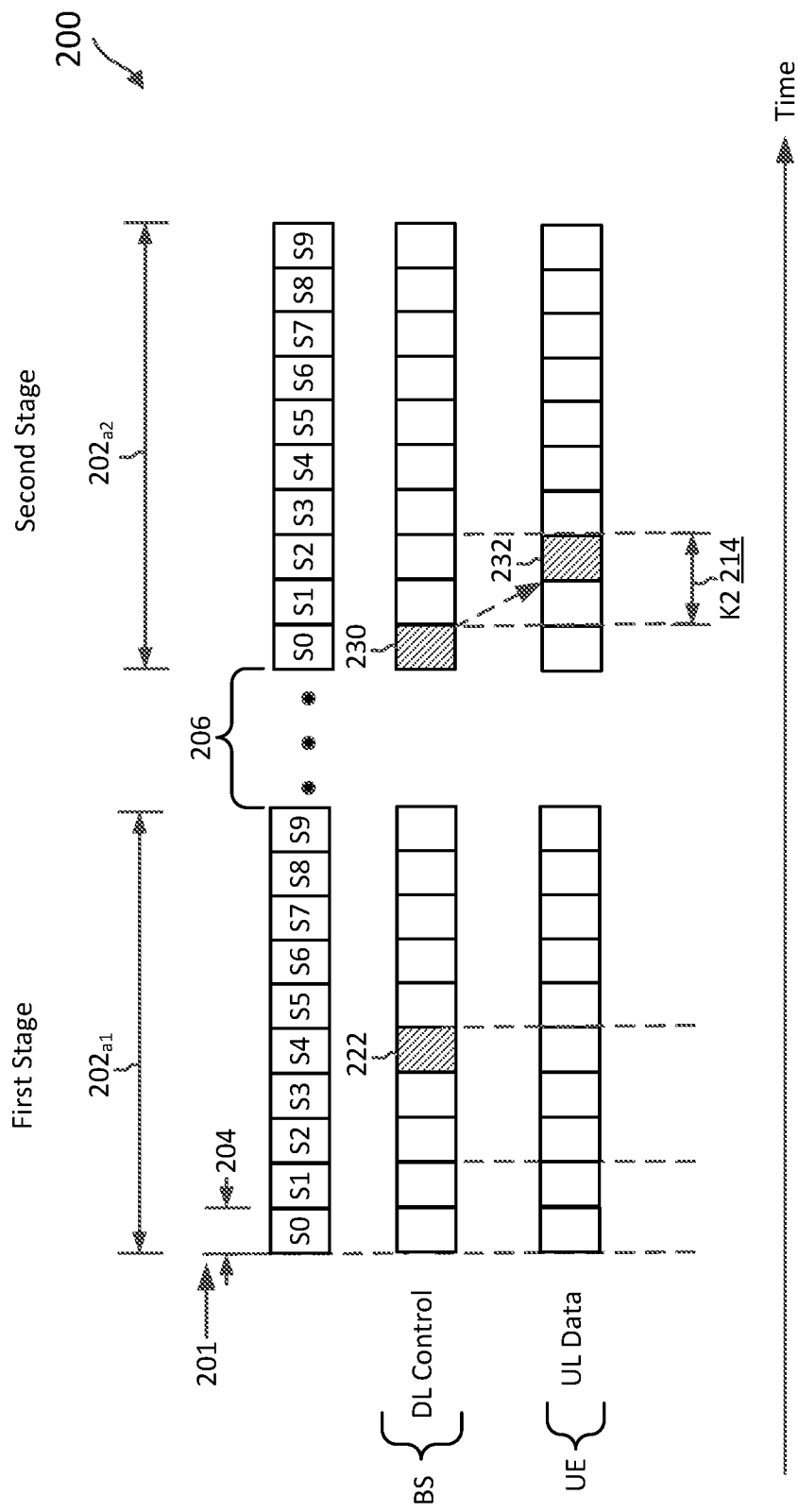
FIG. 2 illustrates a scheduling scheme according to embodiments of the present disclosure.

FIG. 2 illustrates a scheduling scheme 200 according to embodiments of the present disclosure. The scheduling scheme 200 may correspond to a scheduling scheme using a two-stage scheduling grant communicated between a BS 105 and a UE 115 of the network 100. In FIG. 2, the x-axis represents time in some constant units. FIG. 2 shows a frame structure 201 including a plurality of slots 204 in time. In the scheme 200, a BS of a particular operating entity (e.g., Operator A) may successfully contend for a plurality of TXOPs 202 in a shared frequency spectrum. The TXOPs 202 may be non-continuous in time and may refer to an amount of time a station can send frames when it has won contention for the wireless medium. As shown, the TXOPs $202_{a1}$ and $202_{a2}$ are separated by a time period 206 corresponding to TXOPs of other network operating entities (e.g., Operators B and C).

Each TXOP 202 may include a plurality of slots 204. The slots 204 are indexed from S0 to S9. A BS may communicate with a UE in units of slots 204. The slots 204 may also be referred to as transmission time intervals (TTIs). Each slot 204 or TTI carries a medium access control (MAC) layer transport block. Each slot 204 may include a number of symbols in time and a number of frequency tones in frequency. Each slot 204 may include a DL control portion followed by at least one of a subsequent DL data portion, UL data portion, and/or a UL control portion. In the context of LTE, the DL control portion, the DL data portion, the UL data portion, and the UL control portion may be referred to as a physical downlink control channel (PDCCH), a physical downlink shared channel (PDSCH), a physical uplink shared channel (PUSCH), and a physical uplink control channel (PUCCH), respectively.

The BS 105 may communicate a first scheduling grant and a second scheduling grant with the UE 115. The BS and the UE may further communicate based on a parameter 214, denoted as K2. The parameter 214 indicates a time period between reception by the UE of an UL scheduling grant and an active corresponding UL data transmission (e.g., PUSCH transmission). The parameter 214 may be indicated in units of slots 204. As an example, the parameter 214 may indicate a value that is 0 or more (e.g., K2=2). In the context of LTE, the parameter 214 may be indicated in a DL control information (DCI) carried in a PDCCH. The pattern-filled boxes represent transmissions of DL control information, DL data, UL data, an ACK, and/or an NACK in corresponding slots 204. While an entire slot 204 is pattern-filled, a transmission may occur only in a corresponding portion of the slot 204.

In scheme 200, the BS may indicate scheduling information using two UL scheduling grants. In a first stage of the two-stage grant, the BS transmits DL control information 222 in the slot 204 indexed S4 (e.g., in a DL control portion of the slot 204) in a first TXOP $202_{a1}$. The DL control information 222 may indicate a first UL scheduling grant for the UE. In response to receiving the first UL scheduling grant, the UE prepares an UL data packet (e.g., an encoded transport block) and holds its actual transmission until a second UL scheduling grant of the two-stage grant is received (e.g., in a subsequent TXOP).

At a later point in time, in a second stage of the two-stage grant, the BS transmits DL control information 230 in the slot 204 indexed S0 (e.g., in a DL control portion of the slot 204) in a second TXOP $202_{a2}$. The TXOP $202_{a2}$ is subsequent to the TXOP $202_{a1}$. The DL control information 230 may indicate a second UL scheduling grant for the UE. As will be discussed further in the present disclosure, the second UL scheduling grant includes at least one of an SSI or SFI indicating when to start the UL transmission. In response to receiving the first and second UL scheduling grants, the UE transmits an UL data signal 232 to the BS in the slot 204 indexed S2 (e.g., in a UL data portion of the slot 204) based on a UL assignment and the parameter 214 (e.g., K2=2) in the second UL scheduling grant. The slot 204 indexed S2 is two slots from the slot 204 indexed S0.

An advantage of an embodiment may include mitigating the processing timeline delay in a UL data transmission because the delay in slots between the UL grant reception in DL and the UL data (PUSCH) transmission may be reduced. The (n+m) timeline specifies that if an UL scheduling grant is transmitted at the beginning of a slot n, then the earliest slot at which the UE can transmit is m slots later. In LTE, m is 4 slots, and each slot is 1 ms. Accordingly, in LTE, an UL data transmission scheduling scheme may provide for a BS to transmit an UL grant to a UE, which is expected to transmit 4 ms after reception of the UL grant. If the BS transmits an UL grant in subframe n of a TXOP to a UE, the earliest time in which the UE may transmit is subframe (n+4). Additionally, if the BS has no DL data, no data is transmitted between subframes n, (n+1), (n+2), and (n+3) and the medium is wasted. Accordingly, the time delay may be reduced and use of the medium optimized by use of the two-stage grant.

In NR, a non-trivial gap may exist between UL grant reception and UL PUSCH transmission, especially as SCS becomes higher; the higher the SCS, the smaller the slot duration. For example, it can be observed that only the (n+3) timeline is available with 120 Khz SCS, and only the (n+2) timeline is available with 60 Khz SCS. Even if the gap is nontrivial, the two-stage grant may be beneficial in NR because the bandwidth is wider than in LTE. For example, even if the timeline is (n+1), efficiency may still be gained by use of the two-stage grant, as will be further discussed in the present disclosure. In NR, a single-stage grant may indicate to the UE when to transmit the UL data packet based on the UE's processing capability. Accordingly, a timeline gap may exist between reception of the UL grant by the UE and transmission of the UL data packet that may be minimized with the use of the two-stage UL scheduling grant.

A two-stage UL scheduling grant may overcome the above disadvantages. The two-stage UL scheduling grant may correspond to coordination of UL data transmission communicated between a BS 105 and a UE 115 of the network 100. Mechanisms for determining scheduling and/or transmission timeline in accordance with embodiments of the disclosure are described in greater detail herein.

Figure 3:
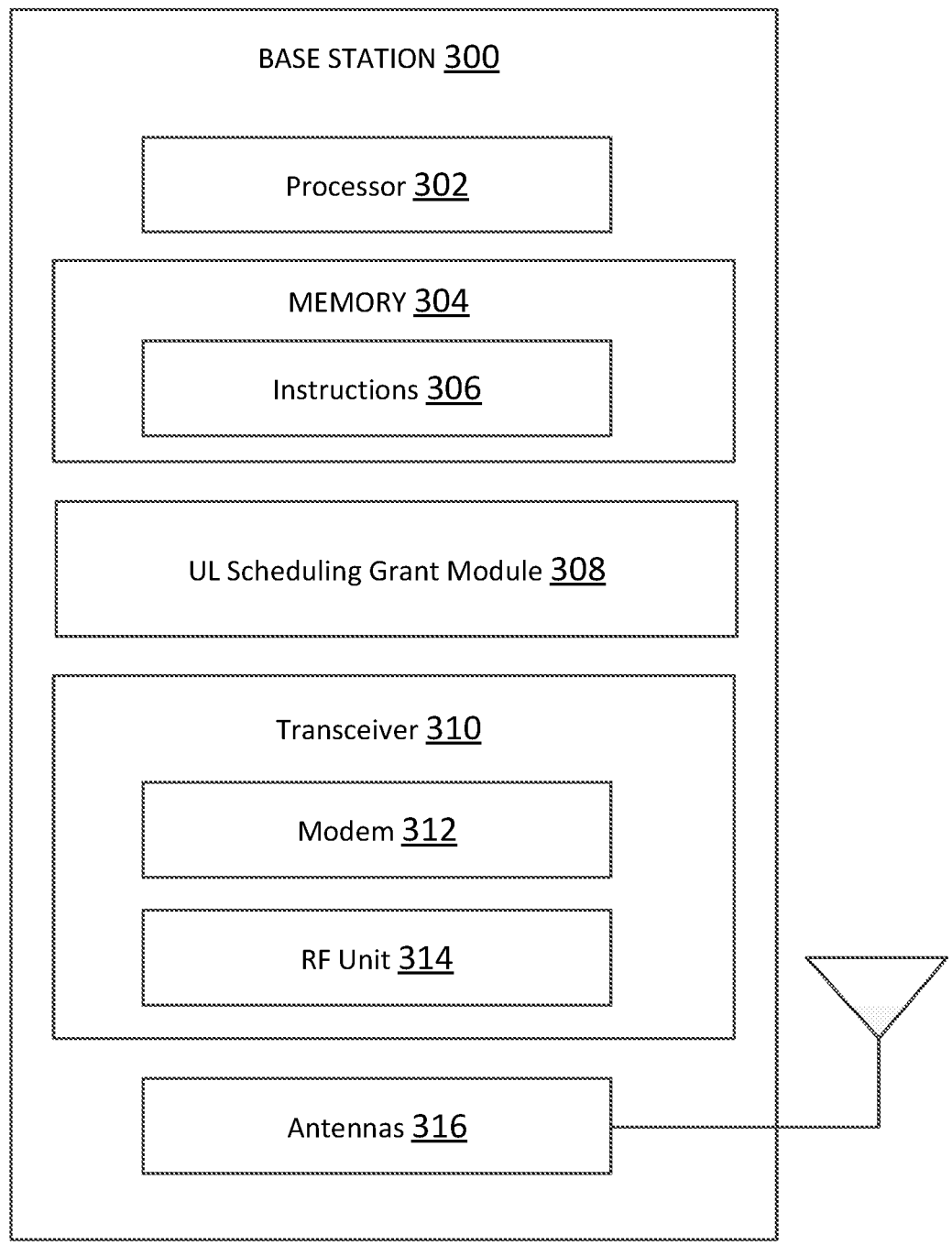
FIG. 3 is a block diagram of an exemplary base station (BS) according to embodiments of the present disclosure.

FIG. 3 is a block diagram of an exemplary BS 300 according to embodiments of the present disclosure. The BS 300 may be a BS 105 as discussed above. As shown, the BS 300 may include a processor 302, a memory 304, an UL scheduling grant module 308, a transceiver 310 including a modem subsystem 312 and a radio frequency (RF) unit 314, and one or more antennas 316. These elements may be in direct or indirect communication with each other, for example via one or more buses.

The processor 302 may have various features as a specific-type processor. For example, these may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, a solid state memory device, one or more hard disk drives, memristor-based arrays, other forms of volatile and non-volatile memory, or a combination of different types of memory. In some embodiments, the memory 304 includes a non-transitory computer-readable medium. The memory 304 may store instructions 306. The instructions 306 may include instructions that, when executed by the processor 302, cause the processor 302 to perform operations described herein with reference to the BSs 105 in connection with embodiments of the present disclosure. Instructions 306 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The UL scheduling grant module 308 may be implemented via hardware, software, or combinations thereof. For example, UL scheduling grant module 308 may be implemented as a processor, circuit, and/or instructions 306 stored in the memory 304 and executed by the processor 302. The UL scheduling grant module 308 may be used for various aspects of the present disclosure. For example, the UL scheduling grant module 308 is configured to communicate with a second wireless communication device (e.g., UE 115) a first scheduling grant and a second scheduling grant. In an example, the UL scheduling grant module 308 encodes an UL scheduling grant, modulates the encoded UL scheduling grant (e.g., using OFDM), and then maps the modulation symbols on to control resources (e.g., in a PDCCH). The UL scheduling grant module 308 transmits the UL scheduling grant using the control resources, which may include frequency tones in one or more symbol time period.

In an example, in a first stage, the UL scheduling grant module 308 transmits a first UL scheduling grant in a first TXOP and in a second stage, transmits a second UL scheduling grant in a subsequent TXOP to the UE. The two-stage scheduling grant includes two individual UL scheduling grants. In some examples, the first UL scheduling grant includes a resource allocation (RA), a start and end symbol for the slot, modulation and coding scheme (MCS), a new data indicator (NDI), and an unknown slot index to indicate to the UE to hold its transmission, and the second UL scheduling grant includes an SSI indicating a slot at which to transmit the UL data. In some examples, the first UL scheduling grant includes an RA, a start and end symbol for the slot, MCS, NDI, and the K2 parameter, and the second UL scheduling grant includes an SFI that triggers activation of the first UL scheduling grant, where K2 stands for the timing delay between the UL burst to the UL transmission, and the UL burst may start a with flexible symbol or an UL symbol, which may be indicated in the SFI. The SFI is used to denote whether a given symbol (e.g., OFDM symbol) in a slot is used for UL, DL, or flexible link direction in the current TXOP. In particular, the SFI indicates a start of the UL burst. The UL scheduling grant module 308 is further configured to monitor for an uplink communication signal based on the first and second scheduling grants. In an example, the UL scheduling grant module 308 receives, based on the first scheduling grant and the second scheduling grant, an UL data packet from the UE.

As shown, the transceiver 310 may include the modem subsystem 312 and the RF unit 314. The transceiver 310 can be configured to communicate bi-directionally with other devices, such as the UEs 115 and/or another core network element. The modem subsystem 312 may be configured to modulate and/or encode data according to a MCS, e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the BS 105 or 300 to enable the BS 105 or 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices and provide the received data messages for processing and/or demodulation at the transceiver 310. The antennas 316 may include multiple antennas of similar or different designs in order to sustain multiple transmission links.

Figure 4:
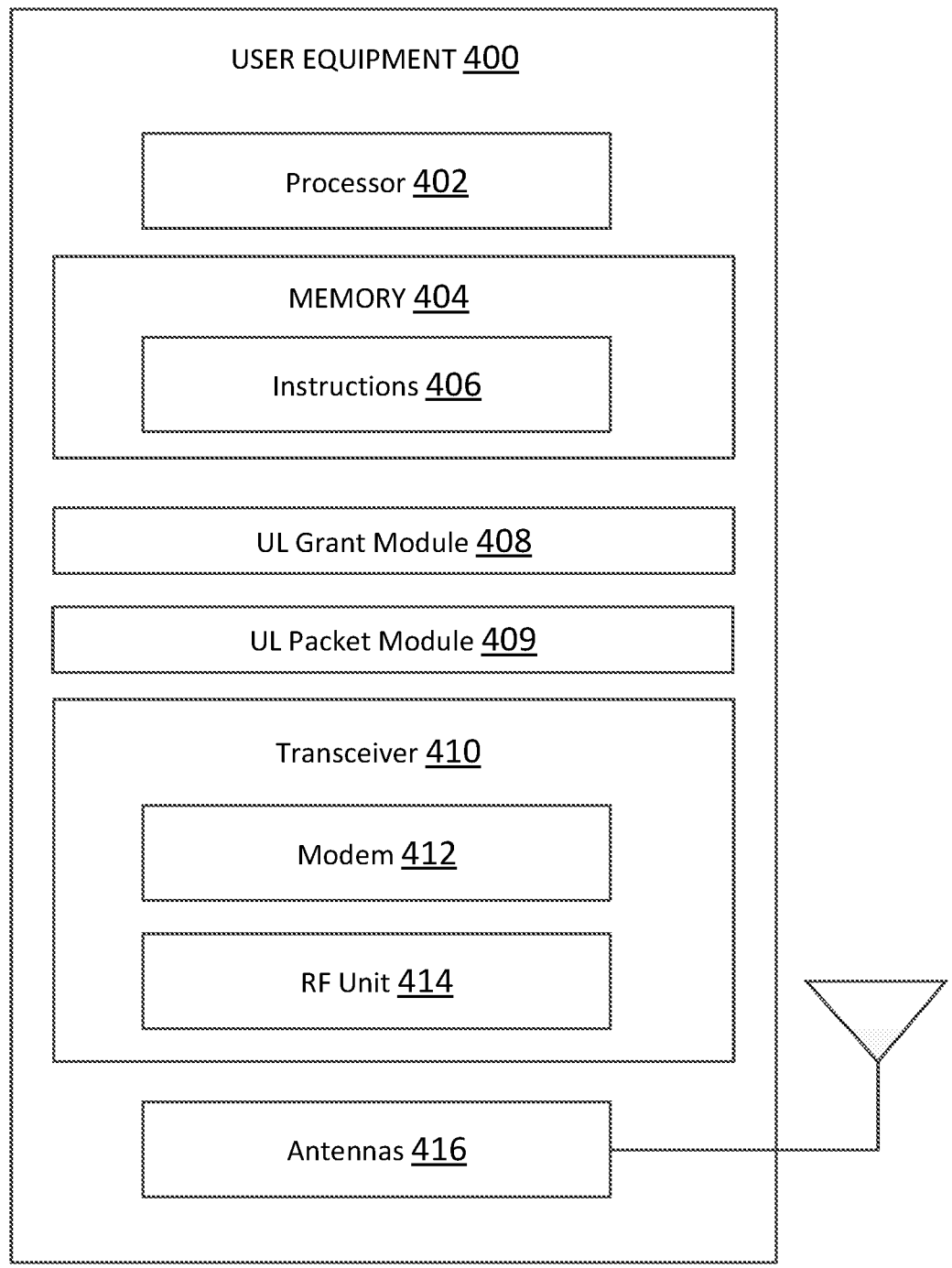
FIG. 4 is a block diagram of an exemplary user equipment (UE) according to embodiments of the present disclosure.

FIG. 4 is a block diagram of an exemplary UE 400 according to embodiments of the present disclosure. The UE 400 may be a UE 115 as discussed above. As shown, the UE 400 may include a processor 402, a memory 404, a UL grant module 408, an UL packet module 409, a transceiver 410 including a modem subsystem 412 and an RF unit 414, and one or more antennas 416. These elements may be in direct or indirect communication with each other, for example, via one or more buses.

The processor 402 may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, solid state memory device, hard disk drives, memristor-based arrays, other forms of volatile and non-volatile memory, or a combination of different types of memory. In some embodiments, the memory 404 includes a non-transitory computer-readable medium. The memory 404 may store instructions 406. The instructions 406 may include instructions that, when executed by the processor 402, cause the processor 402 to perform the operations described herein with reference to the UEs 115 in connection with embodiments of the present disclosure. Instructions 406 may also be referred to as code, which may be interpreted broadly to include any type of computer-readable statement(s) as discussed above with respect to FIG. 3.

The UL grant module 408 and/or UL packet module 409 may be implemented via hardware, software, or combinations thereof. For example, the UL grant module 408 and/or UL packet module 409 may be implemented as a processor, circuit, and/or instructions 406 stored in the memory 404 and executed by the processor 402. The UL grant module 408 and/or UL packet module 409 may be used for various aspects of the present disclosure. For example, the UL grant module 408 is configured to communicate with a second wireless communication device (e.g., BS 105) a first scheduling grant and a second scheduling grant. In an example, in a first stage the UL grant module 408 receives a first UL scheduling grant in a first TXOP and in a second stage receives a second UL scheduling grant in a subsequent TXOP. In response to receiving the first scheduling grant, the UL packet module 409 prepares the UL data packet for transmission and holds its actual transmission until the UL grant module 408 receives a second scheduling grant associated with the first scheduling grant (e.g., based on a hybrid automatic repeat request (HARQ) identifier (ID) match or comparison). In an example, the first scheduling grant may be associated with the second scheduling grant if they have the same HARQ ID, even if not all the parameters in the grants are the same. The UL grant module 408 may receive one or more of the two-stage scheduling grants as discussed in the present disclosure. The UL packet module 409 is further configured to transmit an uplink communication signal based on the first and second scheduling grants. In an example, the UL packet module 409 transmits, based on the first scheduling grant and the second scheduling grant, an UL data packet to the BS. Mechanisms for communicating the scheduling grants are described in greater detail herein.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the UL grant module 408, and/or the UL packet module 409 according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 or 400 to enable the UE 115 or 400 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The antennas 416 may include multiple antennas of similar or different designs in order to sustain multiple transmission links. The RF unit 414 may configure the antennas 416.

Figure 5:
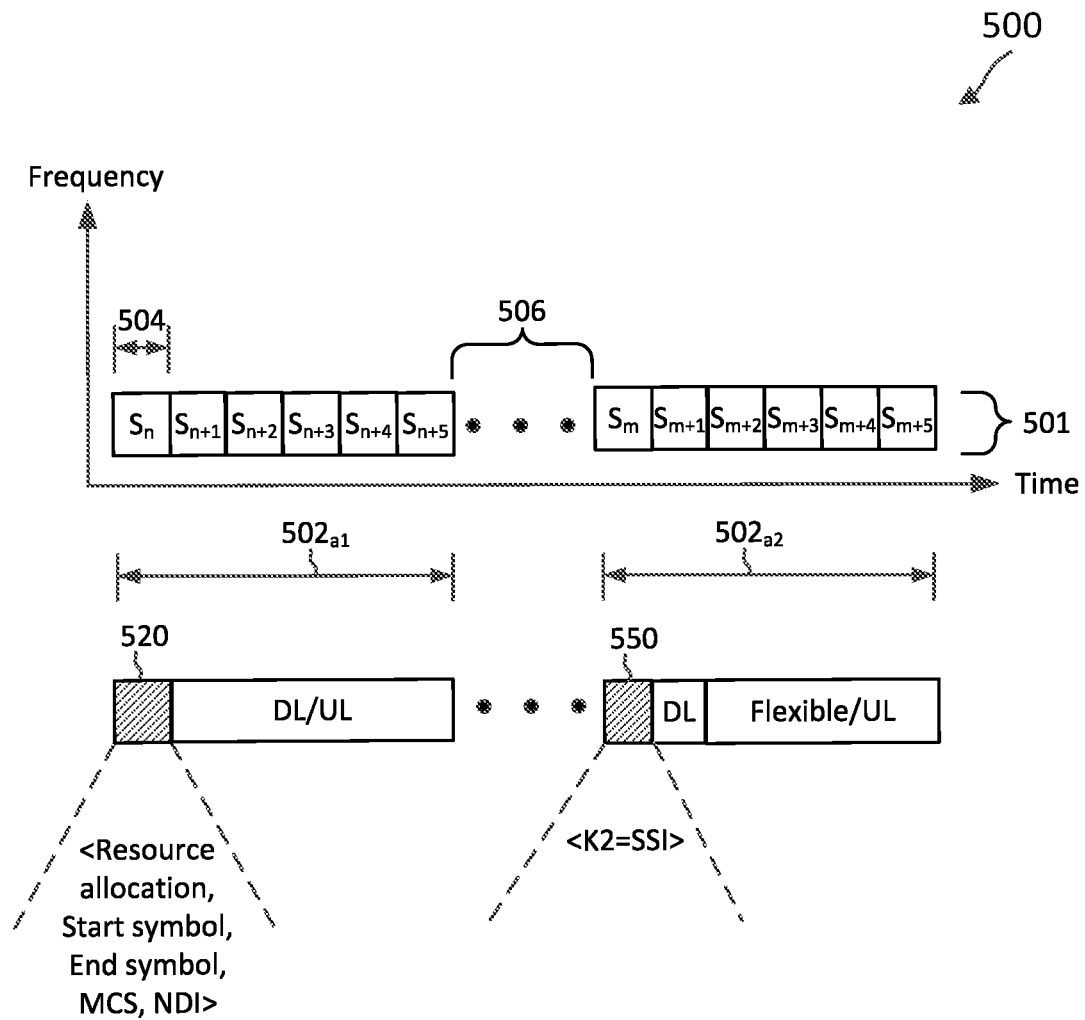
FIG. 5 illustrates a scheduling scheme for uplink (UL) data transmissions according to embodiments of the present disclosure.

FIG. 5 illustrates a scheduling scheme 500 for UL data transmissions according to embodiments of the present disclosure. The scheme 500 may be employed by the BSs 105, 300 and the UEs 115, 400 and illustrates scheduling and transmissions of UL data. The scheme 500 implements a two-stage UL grant scenario in which the BS transmits two individual UL grants at different TXOPs.

In the scheme 500, a BS of a particular operating entity (e.g., Operator A) may successfully contend for a plurality of TXOPs 502 in a shared frequency spectrum 501. The TXOPs 502 may be non-continuous in time and includes a plurality of slots 504. As shown, the TXOPs $502_{a1}$ and $502_{a2}$ are separated by a time period 506 corresponding to TXOPs of other network operating entities (e.g., Operators B and C). In an example, the slots 504 may include a DL control portion (e.g., the DL control portion 222, 230) followed by at least one of a DL data portion, an UL control portion, or an UL data portion (e.g., the UL data portion 232). In some embodiments, each slot 504 may include a duration of about 1 ms or about 0.5 ms. While FIG. 5 illustrates the TXOPs 502 including six slots 504, the TXOPs 502 can include any suitable number of slots 504. For example, a TXOP 502 can include fewer than six slots 504. In another example, a TXOP 502 may include between seven to ten slots 504.

In scheme 500, in a first stage, the BS transmits a first UL scheduling grant 520 in a TXOP $502_{a1}$ for a UE. The first UL scheduling grant 520 may indicate an RA, a start symbol and end symbol in a particular slot, an MCS, an NDI for a UL data transmission, but does not indicate the slot at which the UL data transmission is to start. The remaining slots in the first TXOP $502_{a1}$ may include DL and/or UL symbols. In response to receiving the first UL scheduling grant 520, the UE may prepare the UL data packet and have it ready for transmission. The preparation may include determining a transport block size based on parameters in the first scheduling grant, generating a transport block based on the transport block size, encoding the transport block, and/or modulating the encoded block. Accordingly, when the UE receives a second UL scheduling grant that matches the first UL scheduling grant, the UE may already have the UL data packet prepared and ready for transmission. Two scheduling grants match if they have the same ID (e.g., HARQ process ID). The first and second scheduling grants have the same ID so that the UE can associate them together. If two scheduling grants have different IDs, then they are separate grants and do not match.

Each DL control signal may include scheduling information. In an example, a DL control signal includes the first UL scheduling grant 520 in the slot 504 indexed $S_n$. RRC may configure a 16-entry table including a first set of entries mapping to a single-stage grant and a second set of entries mapping to a two-stage grant. In this way, it may be unnecessary to change the UL grant signal itself. A four-bit time domain PUSCH resource field may map into the 16-entry table, which the BS may use to schedule the start symbol, end symbol, and start slot. If the UE receives entries mapping into the first set of entries, the UE treats the scheduling grant as a single-stage grant. If the UE receives entries mapping into the second set of entries, the UE treats the scheduling grant as part of a two-stage grant.

The second set of entries may indicate that the K2 parameter will be indicated in the second stage, and K2 in the first stage grant is undefined. The BS may configure the 16-entry table (e.g., the K2 parameter) based on the UE's capability report. For example, in NR the list of possible values for K2 that may be configured by RRC is {0, 1, 2, 5, 4, 5, 7, 8, 10, 16, 20, 32}. For the single stage grant, the BS may remove those values that the UE cannot support. For example, if the UE's timeline is (n+2), the BS may remove the values 0 and 1 from being possible values for K2. For the two-stage grant, once the UE receives the UL grant corresponding to an entry of the second set, the UE prepares the UL data packet, while holding its actual transmission.

In a second stage, the BS transmits a second UL scheduling grant 550 in a second TXOP $502_{a2}$ for the UE. The second TXOP $502_{a2}$ is transmitted subsequent to the first TXOP $502_{a1}$. When the BS gains access to the medium, the BS may transmit the second UL scheduling grant 550 that matches the first UL scheduling grant 520. In an example, a DL control signal includes the second UL scheduling grant 550 in the slot 504 indexed $S_m$. In an example, the second UL scheduling grant 550 indicates the SSI at which the UE is to transmit the UL data packet in the current TXOP $502_{a2}$. The SSI indicates the slot in which the UL data transmission associated with the first and second UL scheduling grants is to start. In other words, the SSI indicates when the active UL transmission will occur in the current TXOP. The parameter 214, hereinafter denoted as K2, is submitted in the second UL scheduling grant 550 and specifies the SSI. Because the first UL scheduling grant 520 provides sufficient information for the UE to prepare its UL data packet for transmission, the second UL scheduling grant 550 may use a smaller DCI payload or may reuse the same DCI payload as the first UL scheduling grant 520.

In the scheme 500, the first UL scheduling grant 520 is transmitted in an earlier TXOP $502_{a1}$ than the TXOP $502_{a2}$ in which the second UL scheduling grant 550 is transmitted. In response to receiving the first and second UL scheduling grants, the UE can turn around much faster because the UL data packet may already be prepared by the time the UE receives the second UL scheduling grant. For example, depending on the UE's capability, the UE can transmit one slot after receiving the second UL scheduling grant 550, with an (n+1) processing timeline.

Figure 6:
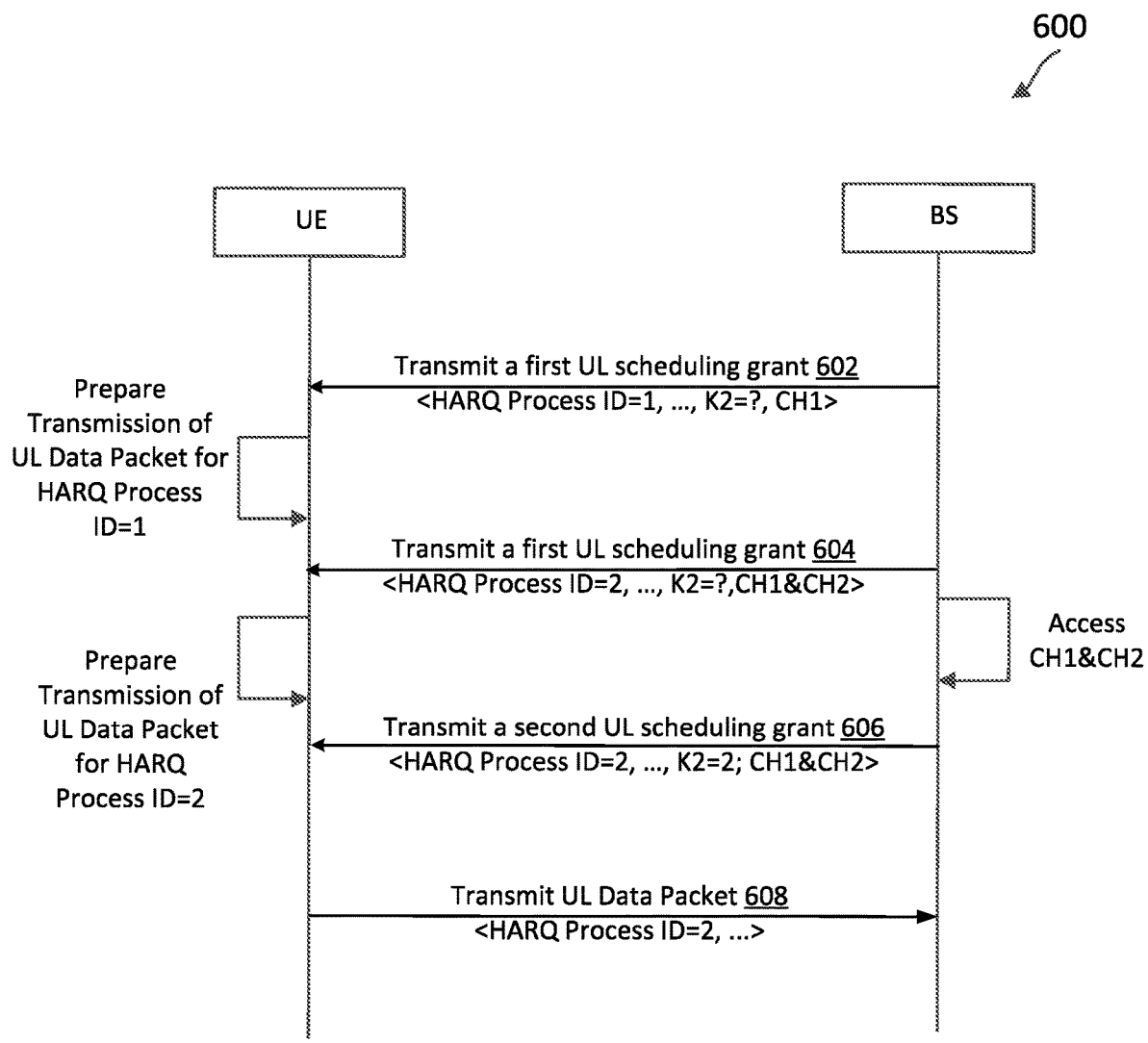
FIG. 6 is a signaling diagram for communicating in a shared communication medium according to embodiments of the present disclosure.

FIG. 6 is a signaling diagram 600 for communicating in a shared communication medium according to embodiments of the present disclosure. Actions specified in the signaling diagram 600 can be executed by a computing device (e.g., a processor, processing circuit, and/or other suitable component) of a wireless communication device, such as the BSs 105 and the UEs 115. The signaling diagram 600 may employ similar mechanisms as in the scheme 600, described with respect to FIG. 6. As illustrated, the signaling diagram 600 includes a number of enumerated steps, but embodiments of the signaling diagram 600 may include additional steps before, after, and in between the enumerated steps. In some embodiments, one or more of the enumerated steps may be omitted or performed in a different order.

The BS may issue multiple first UL scheduling grants to one or more UEs and subsequently issue a second UL scheduling grant that matches with one of them. In an example, the BS may update the UL data transmission based on the medium access status (e.g., channel status). As shown in signaling diagram 600, in a first stage, the BS transmits a first UL scheduling grant 602 in a TXOP. The first UL scheduling grant 602 indicates that HARQ Process ID=1, K2 is unknown, and that the grant corresponds to channel 1 (e.g., a first frequency band). Based on the grant 602, the BS requests that the UE transmit UL data on channel 1. In response to receiving the first UL scheduling grant 602, the UE prepares an UL data packet for HARQ Process ID=1 that may or may not be transmitted to the BS.

In a first stage, the BS transmits a first UL scheduling grant 604 in a TXOP. First grants 602 and 604 may be included in the same or different TXOPs. The first UL scheduling grant 604 indicates that HARQ Process ID=2, K2 is unknown, and that the grant corresponds to two channels. Based on the grant 604, the BS requests that the UE transmit UL data on channels 1 and 2 (e.g., two frequency bands). In response to receiving the first UL scheduling grant 604, the UE prepares an UL data packet for HARQ Process ID=2 that may or may not be transmitted to the BS.

As shown in this example, the UL scheduling grant(s) sent in the first stage does not specify the value of the parameter K2. Accordingly, the UE may prepare a few hypotheses corresponding to the multiple first UL scheduling grants. The BS may be unaware of which channels and/or how many channels it may check out (e.g., by performing medium sensing) until the BS checks out the channel(s). Multiple first stage grants may provide the BS with some flexibility in adapting the UL grant based on the channel checkout status. For example, based on the BS's medium access status, the BS may select a previously sent first UL scheduling grant by transmitting in the second stage of the two-stage UL grant a second UL scheduling grant that matches the selected grant. In an example, if the BS checks out only channel 1, the BS may transmit a second UL scheduling grant (not shown), which matches the first UL scheduling grant 602. In this example, both the first UL scheduling grant 602 and this second UL scheduling grant have the same HARQ processing ID=1. In contrast, if the BS checks out channels 1 and 2, the BS transmits a second UL scheduling grant 606, which matches the first UL scheduling grant 604. Both the first UL scheduling grant 604 and the second UL scheduling grant 606 have the same HARQ processing ID=2. Additionally, the parameter K2=2 in the second UL scheduling grant 606, which indicates that the SSI for active UL transmission is 2 slots later relative to the transmission of the second UL scheduling grant. As shown in signaling diagram 600, in response to receiving the first and second UL scheduling grants 604 and 606, respectively, the UE transmits the UL data packet 608 in accordance with the K2 parameter. In some examples, the same HARQ process ID may be used for the multiple first-stage grants.

The UE may maintain a capability report that is accessible by the BS. To prevent the UE from overexerting itself, the UE may indicate in its capability report the number of first stage scheduling grants that the UE supports. As such, the BS may know the maximum number of first stage scheduling grants (e.g., hypotheses) that it may send to the UE for a particular UL schedule. Additionally, the UE may indicate its processing timeline from reception of an UL scheduling grant to the UL data packet transmission when the UL data packet has not been prepared. In other words, the UE may indicate the processing timeline for the UE to decode a received UL scheduling grant and encode and/or modulate a data packet. Additionally, the UE may indicate its processing timeline from reception of an UL scheduling grant to the UL data packet transmission when the UL data packet is already prepared. In other words, the UE may indicate the processing timeline for the UE to decode a received UL scheduling grant and/or map an already prepared encoded/modulated packet to a particular channel for transmission. Accordingly, the BS may ensure that the SSI indicated in the second UL scheduling grant is consistent with the UE's processing timeline. A SSI is consistent with the UE's processing timeline if the UE has sufficient time to transmit UL data in accordance with the SSI. For example, if the UE is capable of decoding an UL grant and transmitting an UL data packet in two symbols, the second UL scheduling grant is transmitted at symbol n, and the start symbol is symbol n+3, the UE may turn around and transmit the UL data packet within the same slot.

Additionally, the RRC may configure the expiration time of first stage scheduling grants (e.g., X ms) associated with the two-stage grant. If the UE does not receive a matching second UL scheduling grant within the expiration time from when the UE detects the first UL scheduling grant, the UE may discard the first UL scheduling grant.

It may be unnecessary for the fields within the grants to be identical. Some of the parameters (e.g., RA, MCS, etc.) in the second UL scheduling grant may be different from the first UL scheduling grant. The second UL scheduling grant may overwrite the first UL scheduling grant, depending on the BS scheduling implementation. The BS may ensure that the updated UL scheduling grant is consistent with the UE's processing time line. A grant is consistent with the UE's processing timeline if the UE has sufficient time to transmit UL data in accordance with the SSI included in the grant. In some examples, the UE assumes that the second UL scheduling grant is consistent with the first UL scheduling grant. If the timeline (e.g., K2 value) for the second UL scheduling grant is sufficient for the UE to decode the grant and prepare a new UL data packet, the UE may follow the second UL scheduling grant and abandon the first UL scheduling grant.

The UE may indicate its processing timeline from reception of an UL scheduling grant to the UL data packet transmission when the UL data packet has not been prepared. In an example, the UE's capability report specifies that the UE needs (n+3) processing time for decoding a grant and preparing a new UL data packet for transmission. The timeline for the second UL scheduling grant is sufficient for the UE to decode the grant and prepare a new UL data packet if the value of K2 in the second grant is at least three. Accordingly, if the BS desires for the second UL scheduling grant to overwrite the first UL scheduling grant, it is desirable for the BS to know the UE's processing timeline capability and ensure that all other fields in the second UL scheduling grant are consistent with the first UL scheduling grant.

The second UL scheduling grant does not overwrite the first UL scheduling grant if the timeline (e.g., the K2 value) specified in the second UL scheduling grant is insufficient for the UE to decode the grant and prepare a new UL data packet. In keeping with the example above, if the value of K2 in the second grant is less than three (e.g., K2=1), the UE needs more processing time. If the second UL scheduling grant does not overwrite the first UL scheduling grant, both the first and second UL scheduling grants may result into the same transport block size (TBS) except for the K2 value. In an example, the first and second UL scheduling grants are consistent if the TBS size is the same.

The UE may indicate its processing timeline from reception of an UL scheduling grant to the UL data packet transmission when the UL data packet is already prepared. In an example, the UE's capability report specifies that the UE needs (n+1) processing time for decoding a grant and transmitting an already prepared UL data packet. The timeline for the second UL scheduling grant is sufficient for the UE to decode the grant and transmit the already prepared UL data packet if the value of K2 in the second grant is at least one. Here, the UE uses the original UL data packet prepared by the UE in response to the first UL scheduling grant for the UL transmission. As long as the original UL data packet can be used for the UL transmission, the first and second UL scheduling grants are consistent. Here, it is unnecessary for the UE to regenerate (e.g., re-encode) the UL data packet, and the transmission is remapped elsewhere.

For example, in the first UL scheduling grant the BS may schedule the UE to transmit the UL data packet in resource blocks 0-9. In the matching second UL scheduling grant, the BS may remap this transmission and move the UE's UL transmission to resource blocks 10-19. In another example, in the first UL scheduling grant the BS may request that the UE transmit on a first subband. If the BS is unable to check out the first subband but is able to check out a second subband, in the matching second UL scheduling grant, the BS may remap this transmission and request that the UE transmit on the second subband. In these examples, the UE transmits the original UL data packet that was prepared in response to the first UL scheduling grant.

In some examples, the BS ensures that the K2 specified in the second UL scheduling grant is sufficient for the UE to decode the grant and transmit an already prepared UL data packet. The K2 value specified in the second UL scheduling grant may be smaller than the K2 value specified in the single-stage UL scheduling grant.

Additionally, the RRC may configure the expiration time of first stage scheduling grants (e.g., X ms) associated with the two-stage grant. If the UE does not receive a matching second UL scheduling grant within the expiration time from when the UE detects a first UL scheduling grant, the UE may discard the first UL scheduling grant.

Figure 7:
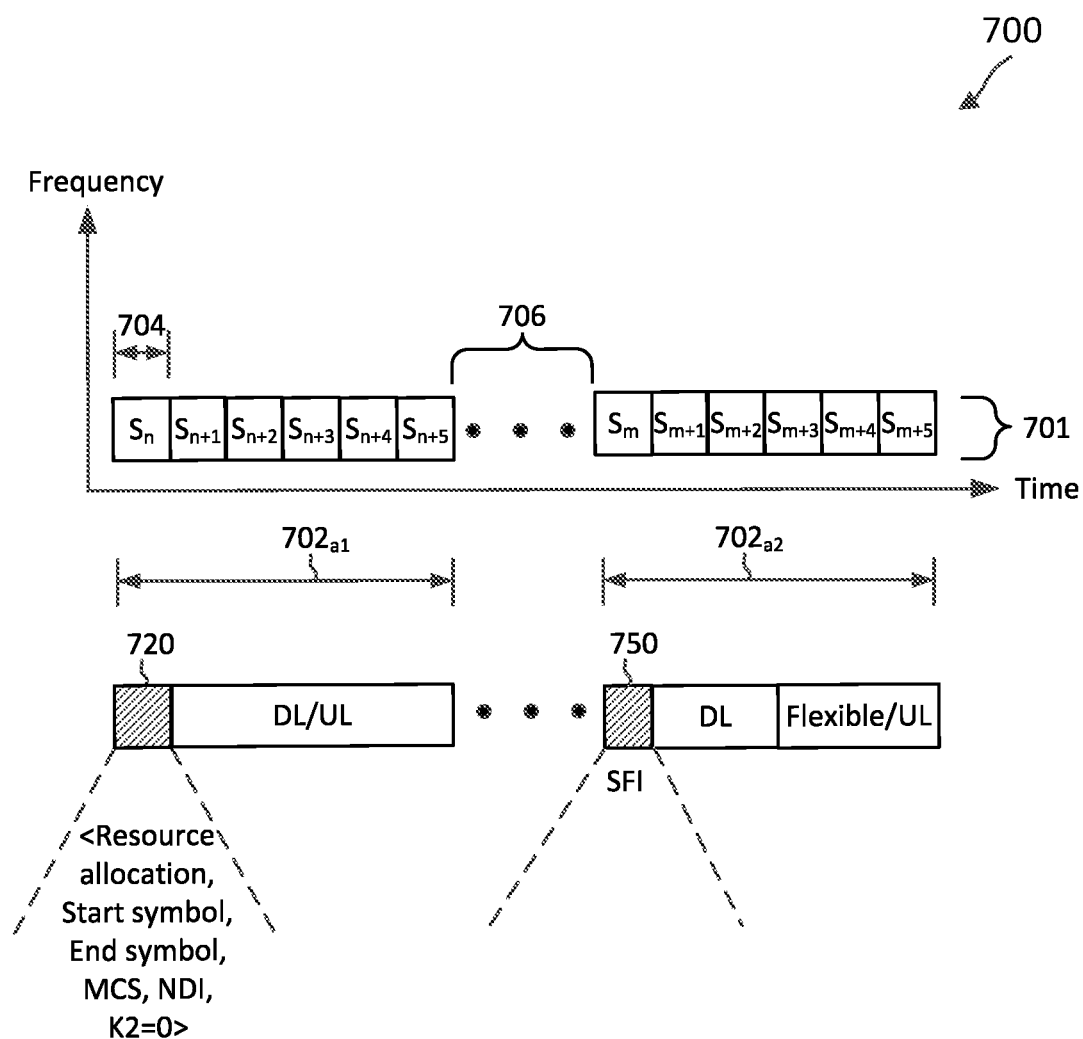
FIG. 7 illustrates a scheduling scheme for UL data transmissions according to embodiments of the present disclosure.

FIG. 7 illustrates a scheduling scheme 700 for UL data transmissions according to embodiments of the present disclosure. The scheme 700 may be employed by the BSs 105, 300 and the UEs 115, 400 and illustrates scheduling and transmissions of UL data. The scheme 700 implements a two-stage UL grant scenario in which the BS transmits in a first stage a first UL scheduling grant and transmits in a second stage a trigger that activates the first UL scheduling grant.

In scheme 700, in a first stage, the BS transmits a first UL scheduling grant 720 in a TXOP 702$_{a1}$ for a UE. The first UL scheduling grant 720 may indicate the RA, start symbol and end symbol in a particular slot, MCS, and NDI. The first UL scheduling grant 720 may also specify the value of the K2 parameter, which may be interpreted as the delay from the UL start (e.g., the first UL symbol) to the UL data transmission (e.g., PUSCH transmission) in the subsequent TXOP. In the scheme 700, the K2 parameter may be smaller and point to the timing delay of the UL transmission relative to the start of the UL burst in the next TXOP. In FIG. 7, K2=0 in the first UL scheduling grant 720, which specifies that the delay from the UL start (e.g., the first UL symbol) to the UL data transmission is 0 slots. The remaining slots in the first TXOP 702$_{a1}$ include DL and/or UL symbols. In response to receiving the first UL scheduling grant 720, the UE may prepare the UL data packet and have it ready for transmission.

In a second stage, the BS transmits a second UL scheduling grant 750 in a second TXOP 702$_{a2}$ for the UE. The second TXOP 702$_{a2}$ is transmitted subsequent to the first TXOP 702$_{a1}$. In an example, the second UL scheduling grant 750 includes an SFI serving as a trigger that activates the first UL scheduling grant 720. The SFI is used to denote whether a given symbol (e.g., OFDM symbol) in a slot is used for UL, DL, or a flexible link direction in the current TXOP. The UE detects the trigger and identifies the start of the UL burst and transmits accordingly to K2 from the start of the UL burst.

In the scheme 700, it may be unnecessary to add a bit in the PUSCH to differentiate between single-stage and two-stage UL scheduling grant schemes. The two-stage UL scheduling grant may be indicated with a different RRC configuration of the 16 entries instead of introducing a field to differentiate between single-stage or two-stage scheduling grants. The BS may divide the 16 entries into a first set of entries mapping to a single-stage grant and into a second set of entries mapping to a two-stage grant. If the UE receives a grant corresponding to any entry in the first set, the UE may interpret the grant as a single-stage grant. If the UE receives a grant that points to any entry in the second set, the UE may interpret the grant as being part of a two-stage grant. The value of the K2 parameter may be interpreted as the delay from the UL start to the UL data transmission in the subsequent TXOP if the 4-bit PUSCH time assignment corresponds to the second set of entries mapping to the two-stage grant based on the RRC configuration.

In the scheme 700, the UL transmission may start with flexible or UL slots/symbols, but does not start with the DL slots/symbols indicated in the SFI. The scheme 700 may convert the flexible slots/symbols into UL slots/symbols, which is consistent with NR philosophy that a dynamic DL/UL grant will overwrite the flexible symbols in SFI. The reference point from where to start the UL burst may start from the flexible symbol or UL symbol.

The first UL scheduling grant 720 issued in the previous TXOP $702_{a1}$ can overwrite the flexible symbols, but not the DL symbols. TXOP $702_{a2}$ includes 6 slots, with the slots 704 indexed $S_{m+1}$ and $S_{m+2}$ including DL symbols and the slots 704 indexed $S_{m+3}$, $S_{m+4}$, and $S_{m+5}$ including UL or flexible symbols. The UE will look at the SFI and recognize that slots 704 indexed $S_{m+1}$ and $S_{m+2}$ include DL symbols. In NR, the UL burst may start with the earliest flexible symbols, which is slot 704 indexed $S_{m+3}$. In FIG. 7, K2=0 in the first UL scheduling grant 720, which specifies that the delay from the slot 704 indexed $S_{m+3}$ to the UL data transmission is 0 slots. Accordingly, the UE transmits the UL data packet at slot 704 indexed $S_{m+3}$.

As another example, in scheme 700, if the first UL scheduling grant indicates that K2=1, the delay from the slot 704 indexed $S_{m+3}$ to the UL data transmission is 1 slot. In this example, the UE transmits the UL data packet at slot 704 indexed $S_{m+4}$, which provides for a one slot timing delay from the UL burst to the UL transmission.

In its capability report, the UE may indicate the processing timeline from decoding the trigger to actual transmission of the UL data packet when the packet is already prepared and/or when the packet is not prepared. The BS may ensure that the K2 value specified in the first UL scheduling grant is consistent with the UE's processing timeline. K2 may be interpreted as the time delay from the trigger to the actual transmission of the UL data packet.

Figure 8:
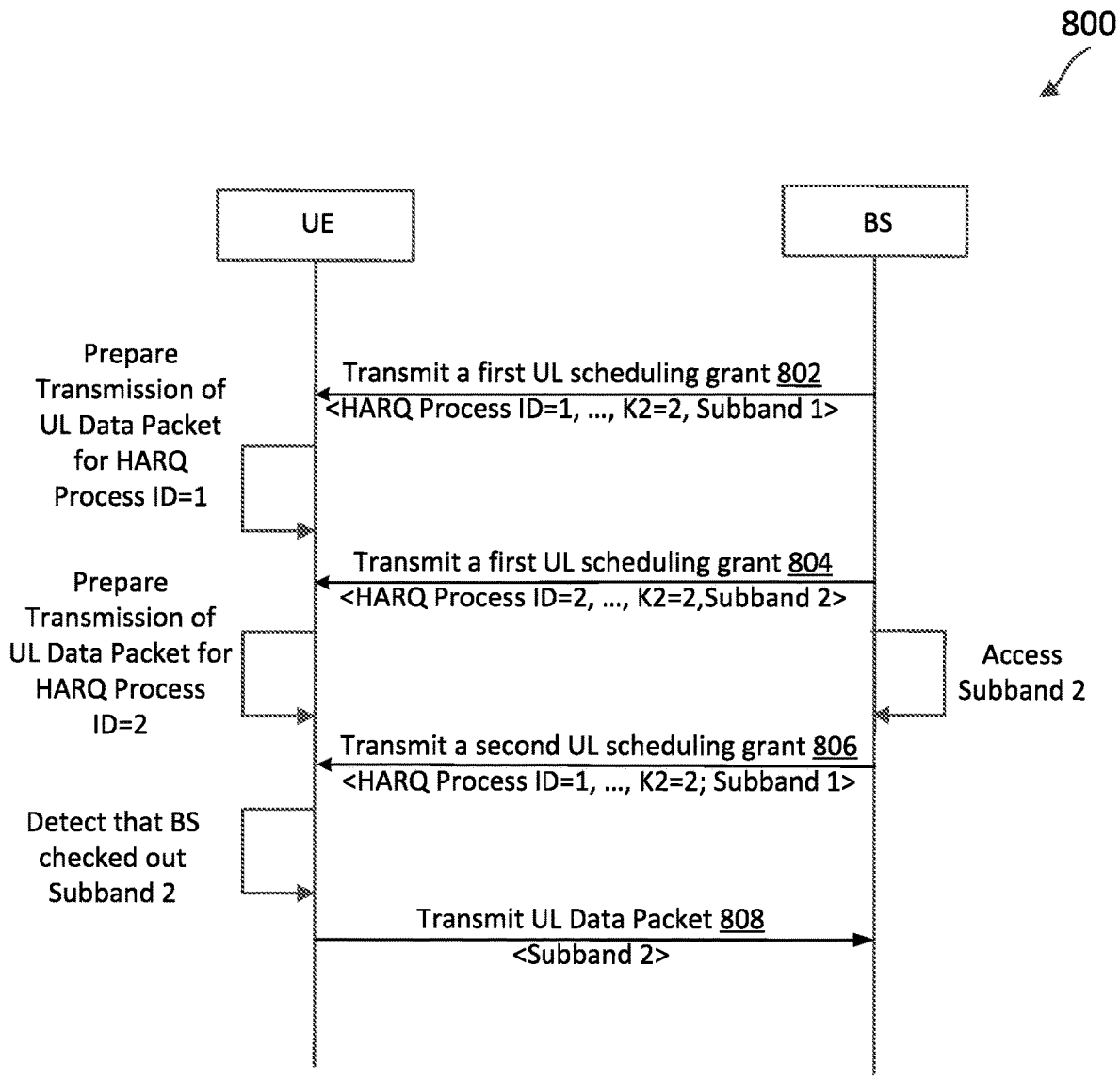
FIG. 8 is a signaling diagram for communicating in a shared communication medium according to embodiments of the present disclosure.

FIG. 8 is a signaling diagram 800 for communicating in a shared communication medium according to embodiments of the present disclosure. Actions specified in the signaling diagram 800 can be executed by a computing device (e.g., a processor, processing circuit, and/or other suitable component) of a wireless communication device, such as the BSs 105, 300 and the UEs 115, 400. The signaling diagram 800 may employ similar mechanisms as in the scheme 700, described with respect to FIG. 7. As illustrated, the signaling diagram 800 includes a number of enumerated steps, but embodiments of the signaling diagram 800 may include additional steps before, after, and in between the enumerated steps. In some embodiments, one or more of the enumerated steps may be omitted or performed in a different order.

The BS may issue multiple first UL scheduling grants to one or more UEs and subsequently issue a second UL scheduling grant that matches with one of them. The multiple first UL scheduling grants may have different HARQ process IDs or different RAs, while having the same value for K2. In an example, the BS may update the UL data transmission based on the medium access status (e.g., channel status). As shown in signaling diagram 800, in a first stage, the BS transmits a first UL scheduling grant 802 in a TXOP. The first UL scheduling grant 802 indicates that HARQ Process ID=1, K2=2, and that the grant corresponds to subband 1. Based on the grant 802, the BS requests that the UE transmit on subband 1. In response to receiving the first UL scheduling grant 802, the UE prepares an UL data packet for HARQ Process ID=1 that may or may not be transmitted to the BS.

In a first stage, the BS transmits a first UL scheduling grant 804 in a TXOP. Grants 802 and 804 may be included in the same or different TXOPs. The first UL scheduling grant 804 indicates that HARQ Process ID=2, K2=2, and that the grant corresponds to subband 2. Based on the grant 802, the BS requests that the UE transmit on subband 2. In response to receiving the first UL scheduling grant 804, the UE prepares an UL data packet for HARQ Process ID=2 that may or may not be transmitted to the BS. In some examples, the same HARQ process ID may be used for the multiple first-stage UL grants.

Accordingly, the UE may prepare a few hypotheses corresponding to the multiple first UL scheduling grants. The BS may be unaware of which channels/subbands and/or how many channels/subbands it may check out until the BS checks out the channel(s)/subbands. Multiple first stage grants may provide the BS with some flexibility in adapting the UL grant based on the channel/subband checkout status. The BS may access subband 2 and send a second UL scheduling grant 806. In FIG. 8, the second UL scheduling grant 806 indicates that HARQ Process ID=1, K2=2, and that the grant corresponds to subband 1, even though the BS actually checked out subband 2. A channel/subband usage indicator or the UE may detect which channel/subband the BS checked out, and the UE may select the correct hypothesis among the multiple received first UL scheduling grants and transmit accordingly. Accordingly, the UE may detect that the BS checked out subband 2, and in response to the first UL scheduling grant 804 and the second UL scheduling grant 806, transmit the UL data packet 808 on subband 2.

As discussed, the UE may maintain a capability report that is accessible by the BS. Additionally, the UE may indicate its processing timeline from reception of the trigger to the UL data packet transmission when the UL data packet has not been prepared and/or when the UL data packet has already been prepared. Accordingly, the BS may ensure that the K2 value indicated in the first UL scheduling grant is consistent with the UE's processing timeline.

Additionally, the RRC may configure the expiration time of first stage scheduling grants (e.g., X ms) associated with the two-stage grant. If the UE does not receive a matching second UL scheduling grant (e.g., the UL scheduling grant including the SSI or the SFI) within the expiration time from when the UE detects a first UL scheduling grant, the UE may discard the first UL scheduling grant.

Figure 9:
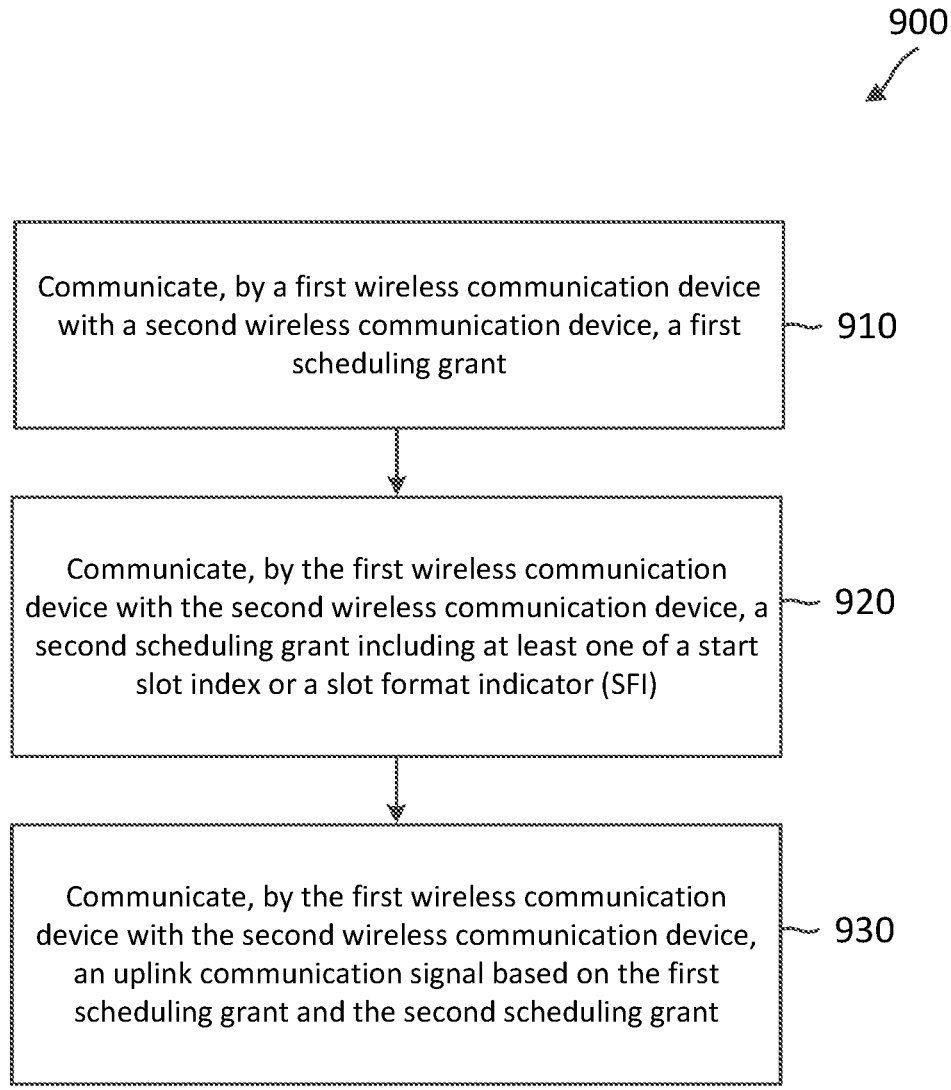
FIG. 9 is a flow diagram of a two-stage scheduling grant communication method according to embodiments of the present disclosure.

FIG. 9 is a flow diagram of a two-stage scheduling grant communication method 900 according to embodiments of the present disclosure. Steps of the method 900 can be executed by a computing device (e.g., a processor, processing circuit, and/or other suitable component) of a wireless communication device, such as the UEs 115 and 400 and the BSs 105 and 300. In some examples, the BS 300, may utilize one or more components, such as the processor 302, the memory 304, the UL scheduling grant module 308, the transceiver 310, and/or the antennas 316 to execute the steps of method 900. In an example, an apparatus includes means for communicating, with a UE, a first scheduling grant; means for communicating, with the UE, a second scheduling grant including at least one of a SSI or a SFI; and means for communicating, with the UE, an uplink communication signal based on the first scheduling grant and the second scheduling grant. In some examples, the UE 400, may utilize one or more components, such as the processor 402, the memory 404, the UL grant module 408, the UL packet module 409, the transceiver 410, and/or the antennas 416 to execute the steps of method 900. In an example, an apparatus includes means for communicating, with a BS, a first scheduling grant; means for communicating, with the BS, a second scheduling grant including at least one of a SSI or a SFI; and means for communicating, with the BS, an uplink communication signal based on the first scheduling grant and the second scheduling grant. The method 900 may employ similar mechanisms as in the schemes 500, 700. As illustrated, the method 900 includes a number of enumerated steps, but embodiments of the method 900 may include additional steps before, after, and in between the enumerated steps. In some embodiments, one or more of the enumerated steps may be omitted or performed in a different order.

At step 910, the method 900 includes communicating, by a first wireless communication device with a second wireless communication device, a first scheduling grant (e.g., the first scheduling grant 520, 720). In one embodiment, the first wireless communication device may correspond to a BS and the second wireless communication device may correspond to a UE. In another embodiment, the first wireless communication device may correspond to a UE and the second wireless communication device may correspond to a BS.

At step 920, the method 900 includes communicating, by the first wireless communication device with the second wireless communication device, a second scheduling grant (e.g., the second scheduling grant 550, 750) including at least one of a SSI or SFI. In the scheme 500, the first scheduling grant indicates the RA, start symbol and end symbol in a particular slot, MCS, NDI, but does not indicate the slot at which the UL data transmission is to start. Additionally, the second scheduling grant indicates the SSI, which specifies a slot at which to transmit the UL data in the current TXOP. In the scheme 700, the first scheduling grant indicates the RA, start symbol and end symbol in a particular slot, MCS, and NDI, and the value of the K2 parameter. Additionally, the second scheduling grant indicates the SFI, which is used to denote whether a given symbol (e.g., OFDM symbol) in a slot is used for UL, DL, or flexible in the current TXOP. In particular, the SFI indicates a start of the UL burst.

At step 930, the method 900 includes communicating, by the first wireless communication device with the second wireless communication device, an uplink communication signal based on the first scheduling grant and the second scheduling grant. In scheme 500, if the first wireless communication device corresponds to the BS, the uplink communication signal is received in accordance with the delay specified by SSI in the second UL scheduling grant. If the first wireless communication device corresponds to the UE, the uplink communication signal is transmitted in accordance with the delay specified by SSI in the second UL scheduling grant. In scheme 700, if the first wireless communication device corresponds to the BS, the uplink communication signal is received in accordance with the delay specified in the first UL scheduling grant (e.g., value of K2) and the start of the UL burst specified by the SFI. If the first wireless communication device corresponds to the UE, the uplink communication signal is transmitted in accordance with the delay specified in the first UL scheduling grant (e.g., value of K2) and the start of the UL burst specified by the SFI.

As discussed, the delay between PDCCH and PUSCH without the two-stage grant technique may be long. The delay may be attributable to the time consumed for decoding PDCCH and preparing PDSCH, and may be as much as 700 microseconds (µs) for SCS of 15 KHz and 400 us for SCS of 30 KHz. With the two-stage grant technique, the delay between the second stage of the grant and PUSCH may be reduced to include only the time it takes to decode PDCCH. The delay, however, may still be substantial as the UE may perform blind decoding of PDCCH covering different aggregation levels, offsets, payload sizes, etc. The UE may perform blind decoding of the PDCCH payload as it is unaware of the detailed control channel structure, including the number of control channels and the number of control channel elements (CCEs) to which each control channel is mapped. Multiple PDCCHs may be transmitted in a single subframe, which may or may not be all relevant to a particular UE. The UE determines the PDCCH specific to it by monitoring a set of PDCCH candidates (a set of consecutive CCEs on which a PDCCH could be mapped) in every subframe. It may be desirable to reduce the delay between the second stage of the grant and the start of PUSCH.

In some examples, the delay between the second stage of the grant and the start of PUSCH may be reduced by reducing blind decoding attempts of the second PDCCH. In an example, the first UL scheduling grant includes an indication of a pre-configured reduced search space or blind decoding for the second PDCCH for finding the second UL scheduling grant. In this example, it is unnecessary for the UE to search the entire search space for the second UL scheduling grant, potentially saving time and processing cycles. Such an implementation may be more feasible if the second PDCCH is a group or cell trigger. Additionally, the first PDCCH included in the first UL scheduling grant may point to the blind decoding candidate (or candidates) for the second PDCCH. In an example, a linkage between the first PDCCH and the second PDCCH in terms of the blind decoding hypotheses may be implemented. Such an implementation may be more feasible when both the first PDCCH and the second PDCCH are UE specific.

In some examples, the delay between the second stage of the grant and the start of PUSCH may be reduced by providing a particular ordering for the PDCCH blind decoding such that the UE finds the second stage PDCCH faster even if the UE has not yet finished processing all the PDCCH blind decoding hypotheses. In an example, the first UL scheduling grant includes an indication of a particular ordering for a blind decoding for a second PDCCH for finding the second UL scheduling grant. The ordering may be pre-configured and/or determined based on parameters for the first PDCCH (e.g., aggregation level, offset, information in its payload, etc.). In an example, the delay between PDCCH and PUSCH may be a function of which blind decoding hypothesis has the second stage grant in this ordering.

In some examples, the delay between the second stage of the grant and the start of PUSCH may be reduced by providing a new signal that is quickly processed (e.g., e.g. wake up signal, preamble, etc.) rather than PDCCH, where the second stage grant is the new signal. In an example, a signal indicating a location of a second PDCCH for finding the second UL scheduling grant is communicated.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, including communicating, by a first wireless communication device with a second wireless communication device, a first scheduling grant; communicating, by the first wireless communication device with the second wireless communication device, a second scheduling grant including at least one of a SSI or a SFI; and communicating, by the first wireless communication device with the second wireless communication device, an uplink communication signal based on the first scheduling grant and the second scheduling grant.

In some examples, the first wireless communication device is a BS, and the second wireless communication device is a UE. In some examples, communicating the first scheduling grant includes transmitting the first scheduling grant in a first TXOP, communicating the second scheduling grant includes transmitting the second scheduling grant in a second TXOP, and communicating the uplink communication signal includes receiving an uplink data packet in the second TXOP. In some examples, the first wireless communication device is a UE, and the second wireless communication device is a BS. In some examples, communicating the first scheduling grant includes receiving the first scheduling grant in a first TXOP, communicating the second scheduling grant includes receiving the second scheduling grant in a second TXOP, and communicating the uplink communication signal includes transmitting an uplink data packet in the second TXOP.

In some examples, the first scheduling grant is communicated during a first TXOP, and the second scheduling grant and the uplink communication signal are communicated during a second TXOP. In some examples, the first scheduling grant includes at least one of a RA, a start and end symbol for a slot, an MCS, or an NDI. In some examples, the second TXOP includes a plurality of slots, and the second scheduling grant includes a parameter indicating a slot at which to transmit the UL data. In some examples, the parameter is the SSI relative to transmission of the second scheduling grant. In some examples, the parameter is an unknown slot index included in the first scheduling grant. In some examples, the uplink communication signal includes an UL data packet, and the first scheduling grant includes an unknown slot index to indicate to the second wireless communication device to hold transmission of the communication signal.

In some examples, the first scheduling grant includes at least one of an RA, a start and end symbol for a slot, an MCS, an NDI, and a parameter indicating a timing delay of the communicating the uplink communication signal relative to a start of a set of flexible or UL symbols in the second TXOP. In some examples, the second scheduling grant triggers activation of the first scheduling grant. In some examples, the second TXOP includes a plurality of slots, and the second scheduling grant includes the SFI denoting whether a given symbol in a slot is used for an uplink, a downlink, or a flexible link direction. In some examples, communicating the first scheduling grant includes communicating an indication of a pre-configured reduced search space or blind decoding for a second PDCCH for finding the second UL scheduling grant. In some examples, communicating the first scheduling grant includes communicating an indication of a particular ordering for a blind decoding for a second PDCCH for finding the second UL scheduling grant. In some examples, the method also includes communicating a signal indicating a location of a second PDCCH for finding the second UL scheduling grant.

Further embodiments of the present disclosure include an apparatus including a transceiver configured to: communicate, with a second wireless communication device, a first scheduling grant; communicate, with the second wireless communication device, a second scheduling grant including at least one of a SSI or a SFI; and communicate, with the second wireless communication device, an uplink communication signal based on the first scheduling grant and the second scheduling grant.

In some examples, the second wireless communication device is a UE. In some examples, the second wireless communication device is a BS. In some examples, the transceiver is included in a UE. In some examples, the transceiver is included in a BS. In some examples, the first scheduling grant is included in a first TXOP, the second scheduling grant is included in a second TXOP, and the uplink communication signal includes an uplink data packet in the second TXOP. In some examples, the first scheduling grant includes at least one of a RA, a start and end symbol for a slot an, an MCS, or a NDI. In some examples, the second TXOP includes a plurality of slots, and the second scheduling grant includes a parameter indicating a slot at which to transmit the UL data. In some examples, the parameter is the SSI relative to transmission of the second scheduling grant. In some examples, the first scheduling grant includes at least one of an RA, a start and end symbol for a slot, an MCS, an NDI, and a parameter indicating a timing delay of the communicating the uplink communication signal relative to a start of a set of flexible or UL symbols in the second TXOP. In some examples, the second scheduling grant triggers activation of the first scheduling grant. In some examples, the second TXOP includes a plurality of slots, and the second scheduling grant includes the SFI denoting whether a given symbol in a slot is used for an uplink, a downlink, or a flexible link direction.

Further embodiments of the present disclosure include a computer-readable medium having program code recorded thereon, the program code including: code for causing a first wireless communication device to communicate, with a second wireless communication device, a first scheduling grant; code for causing the first wireless communication device to communicate, with a second wireless communication device, a second scheduling grant including at least one of a start slot index (SSI) or a slot format indicator (SFI); and code for causing the first wireless communication device to communicate, an uplink communication signal based on the first scheduling grant and the second scheduling grant. In some examples, the first wireless communication device is a BS, and the second wireless communication device is a UE. In some examples, the first wireless communication device is a UE, and the second wireless communication device is a BS.

Further embodiments of the present disclosure include an apparatus including means for communicating, with a second wireless communication device, a first scheduling grant; means for communicating, with a second wireless communication device, a second scheduling grant including at least one of a start slot index (SSI) or a slot format indicator (SFI); and means for communicating, with the second wireless communication device, an uplink communication signal based on the first scheduling grant and the second scheduling grant.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication by a base station (BS), comprising:
   transmitting, to a user equipment (UE), a first-stage scheduling grant;
   transmitting, to the UE, an additional first-stage scheduling grant, wherein the additional first-stage scheduling grant is associated with the first-stage scheduling grant;
   transmitting, to the UE, a second-stage scheduling grant including at least one of a start slot index (SSI) or a slot format indicator (SFI), wherein the second-stage scheduling grant corresponds to one of the first-stage scheduling grant or the additional first-stage scheduling grant; and
   receiving, from the UE, an uplink communication signal based on the second-stage scheduling grant and the one of the first-stage scheduling grant or the additional first-stage scheduling grant.

2. The method of claim 1, wherein the transmitting the first-stage scheduling grant includes transmitting the first-stage scheduling grant in a first transmission opportunity (TXOP), wherein the transmitting the second-stage scheduling grant includes transmitting the second-stage scheduling grant in a second TXOP, and wherein the receiving the uplink communication signal includes receiving an uplink data packet in the second TXOP.

3. The method of claim 1, wherein the first-stage scheduling grant is communicated during a first transmission opportunity (TXOP), and wherein the second-stage scheduling grant and the uplink communication signal are communicated during a second TXOP.

4. The method of claim 3, wherein the first-stage scheduling grant includes at least one of a resource allocation (RA), a start and end symbol for a slot, a modulation and coding scheme (MCS), or a new data indicator (NDI).

5. The method of claim 4, wherein the second TXOP includes a plurality of slots, and the second-stage scheduling grant includes a parameter indicating a slot at which to transmit the uplink communication signal.

6. The method of claim 5, wherein the parameter is the SSI relative to transmission of the second-stage scheduling grant.

7. The method of claim 5, wherein the parameter is an unknown slot index included in the first-stage scheduling grant.

8. The method of claim 7, wherein the uplink communication signal includes an uplink data packet, and the first-stage scheduling grant includes an unknown slot index to indicate to the UE to hold transmission of the uplink communication signal.

9. The method of claim 3, wherein the first-stage scheduling grant includes at least one of an RA, a start and end symbol for a slot, an MCS, an NDI, and a parameter indicating a timing delay of the transmitting the uplink communication signal relative to a start of a set of flexible or uplink symbols in the second TXOP.

10. The method of claim 9, wherein the second-stage scheduling grant triggers activation of the one of the first-stage scheduling grant or the additional first-stage scheduling grant.

11. The method of claim 9, wherein the second TXOP includes a plurality of slots, and the second-stage scheduling grant includes the SFI denoting whether a given symbol in a slot is used for an uplink, a downlink, or a flexible link direction.

12. The method of claim 1, wherein the transmitting the first-stage scheduling grant includes transmitting the first-stage scheduling grant on a first physical downlink channel (PDCCH), and the transmitting the second-stage scheduling grant includes receiving the second-stage scheduling grant on a second PDCCH indicated by a signal received at the UE.

13. An apparatus comprising:
   a transceiver; and
   one or more processors coupled to the transceiver, wherein the one or more processors are configured, individually or in combination, to cause the apparatus to:
      transmit, to a user equipment (UE), a first-stage scheduling grant;
      transmit, to the UE, an additional first-stage scheduling grant, wherein the additional first-stage scheduling grant is associated with the first-stage scheduling grant;

transmit, to the UE, a second-stage scheduling grant including at least one of a start slot index (SSI) or a slot format indicator (SFI), wherein the second-stage scheduling grant corresponds to one of the first-stage scheduling grant or the additional first-stage scheduling grant; and receive, from the UE, an uplink communication signal based on the second-stage scheduling grant and the one of the first-stage scheduling grant or the additional first-stage scheduling grant.

14. The apparatus of claim 13, wherein the first-stage scheduling grant is included in a first transmission opportunity (TXOP), the second-stage scheduling grant is included in a second TXOP, and the uplink communication signal includes an uplink data packet in the second TXOP.

15. The apparatus of claim 14, wherein the first-stage scheduling grant includes at least one of a resource allocation (RA), a start and end symbol for a slot an, a modulation and coding scheme (MCS), or a new data indicator (NDI).

16. The apparatus of claim 15, wherein the second TXOP includes a plurality of slots, and the second-stage scheduling grant includes a parameter indicating a slot at which to transmit the uplink communication signal.

17. The apparatus of claim 16, wherein the parameter is the SSI relative to transmission, from a base station (BS), of the second-stage scheduling grant.

18. The apparatus of claim 16, wherein the first-stage scheduling grant includes at least one of an RA, a start and end symbol for a slot, a modulation and coding scheme (MCS), a new data indicator (NDI), and a parameter indicating a timing delay of the communication of the uplink communication signal relative to a start of a set of flexible or uplink symbols in the second TXOP.

19. The apparatus of claim 18, wherein the second-stage scheduling grant triggers activation of the first-stage scheduling grant.

20. The apparatus of claim 19, wherein the second TXOP includes a plurality of slots, and the second-stage scheduling grant includes the SFI denoting whether a given symbol in a slot is used for an uplink, a downlink, or a flexible link direction.

21. The apparatus of claim 13, wherein the one or more processors are further configured, individually or in combination, to cause the apparatus to:

transmit the first-stage scheduling grant on a first physical downlink channel (PDCCH); and transmit the second-stage scheduling grant on a second PDCCH indicated by a signal received by the transceiver.

22. A non-transitory computer-readable medium having program code recorded thereon, the program code comprising:

code for causing base station (BS) to transmit, to a user equipment (UE), a first-stage scheduling grant;

code for causing the BS to transmit, to the UE, an additional first-stage scheduling grant, wherein the additional first-stage scheduling grant is associated with the first-stage scheduling grant;

code for causing the BS to transmit, to the UE, a second-stage scheduling grant including at least one of a start slot index (SSI) or a slot format indicator (SFI), wherein the second-stage scheduling grant corresponds to one of the first-stage scheduling grant or the additional first-stage scheduling grant; and code for causing the BS to receive, from the UE, an uplink communication signal based on the second-stage scheduling grant and the one of the first-stage scheduling grant or the additional first-stage scheduling grant.

23. The non-transitory computer-readable medium of claim 22, wherein the code for causing the BS to transmit the first-stage scheduling grant includes code for causing the BS to transmit the first-stage scheduling grant in a first transmission opportunity (TXOP), wherein the code for causing the BS to transmit the second-stage scheduling grant includes code for causing the BS to transmit the second-stage scheduling grant in a second TXOP, and wherein the code for causing the BS to receive the uplink communication signal includes code for causing the BS to receive an uplink data packet in the second TXOP.

24. The non-transitory computer-readable medium of claim 22, wherein the first-stage scheduling grant is communicated during a first TXOP, and wherein the second-stage scheduling grant and the uplink communication signal are communicated during a second TXOP.

25. The non-transitory computer-readable medium of claim 24, wherein the first-stage scheduling grant includes at least one of a resource allocation (RA), a start and end symbol for a slot, a modulation and coding scheme (MCS), or a new data indicator (NDI), wherein the second TXOP includes a plurality of slots, and the second-stage scheduling grant includes a parameter indicating a slot at which to transmit the uplink communication signal, wherein the parameter is at least one of the SSI relative to transmission, by the BS, of the second-stage scheduling grant or an unknown slot index included in the first-stage scheduling grant.

26. The non-transitory computer-readable medium of claim 24, wherein the first-stage scheduling grant includes at least one of an RA, a start and end symbol for a slot, an MCS, an NDI, and a parameter indicating a timing delay of the communication of the uplink communication signal relative to a start of a set of flexible or uplink symbols in the second TXOP.

27. The non-transitory computer-readable medium of claim 26, wherein the second-stage scheduling grant triggers activation of the first-stage scheduling grant.

28. The non-transitory computer-readable medium of claim 27, wherein the second TXOP includes a plurality of slots, and the second-stage scheduling grant includes the SFI denoting whether a given symbol in a slot is used for an uplink, a downlink, or a flexible link direction.

29. The non-transitory computer-readable medium of claim 22, wherein the code for causing the BS to transmit the first-stage scheduling grant includes code for causing the BS to transmit the first-stage scheduling grant on a first physical downlink channel (PDCCH).

30. The non-transitory computer-readable medium of claim 29, wherein the code for causing the BS to transmit the second-stage scheduling grant includes code for causing the BS to transmit the second-stage scheduling grant on a second PDCCH indicated in a signal received by the UE.

* * * * *